United States Patent [19]

Johnson et al.

[11] Patent Number: 5,051,464
[45] Date of Patent: Sep. 24, 1991

[54] WATERBORNE ACRYLOURETHANE PIGMENT DISPERSANT POLYMER

[75] Inventors: Jeffery W. Johnson; Robert D. Prottas, both of Wilmington, Del.; Clifford H. Strolle, Springfield, Pa.

[73] Assignee: E. I. Du Pont de Nemours and Company, Wilmington, Del.

[21] Appl. No.: 401,870

[22] Filed: Sep. 1, 1989

[51] Int. Cl.$^5$ .......................... C08J 00/00; C08F 8/00
[52] U.S. Cl. ..................... 524/555; 525/131
[58] Field of Search ......................... 525/131; 524/555

[56] References Cited

U.S. PATENT DOCUMENTS

| | | | |
|---|---|---|---|
| 3,028,367 | 4/1962 | O'Brien | 260/77.5 |
| 3,671,496 | 6/1972 | Masuda | 260/77.5 |
| 3,853,822 | 12/1974 | Brad | 260/77.5 |
| 3,867,347 | 2/1975 | Felber | 260/63 |
| 3,878,139 | 4/1975 | Takahashi | 260/17 A |
| 4,064,294 | 12/1977 | Babil | 427/373 |
| 4,234,468 | 11/1980 | Dalibor | 260/31.2 |
| 4,243,573 | 1/1981 | Simms | 260/33.6 |
| 4,247,578 | 1/1981 | Skinner | 427/44 |
| 4,248,978 | 2/1981 | deCleur | 525/124 |
| 4,255,298 | 3/1981 | Simms | 260/17 A |
| 4,309,330 | 1/1982 | Ukita | 260/29.7 |
| 4,322,508 | 3/1982 | Peng | 525/110 |
| 4,426,510 | 1/1984 | DelDonno | 521/113 |
| 4,443,589 | 4/1984 | Tobias | 527/300 |
| 4,558,090 | 12/1985 | Drexler | 524/591 |
| 4,578,426 | 3/1986 | Lenz | 525/131 |
| 4,617,349 | 10/1986 | Nasu | 525/123 |
| 4,659,780 | 4/1987 | Stamgena | 525/131 |
| 4,711,929 | 12/1987 | Stamega | 525/131 |
| 4,730,020 | 3/1988 | Wilfinger | 524/555 |
| 4,732,960 | 3/1988 | Rasshafer | 528/75 |
| 4,839,414 | 6/1989 | Bederke | 525/131 |

*Primary Examiner*—Paul R. Michl
*Assistant Examiner*—Patrick Niland
*Attorney, Agent, or Firm*—Hilmar L. Fricke

[57] ABSTRACT

An improved waterbased coating composition containing about 10–50% by weight of film forming binder and pigment in a pigment to binder weight ratio of about 1/100 to 200/100 dispersed in an aqueous carrier and having a pH of about 7–10; wherein the improvement used in the composition is a acrylourethane pigment dispersing polymer in an amount of about 0.5–10% by weight, based on the weight of the coating composition; the acrylourethane pigment dispersing polymer is composed of hydroxyl and carboxyl functional acrylic polyol having a hydroxyl no. of about 50–170 and an acid no. of about 30–120 and chain extended with an aliphatic, cycloaliphatic or aromatic diisocyanate in the presence of a monohydric alcohol and the polymer has a weight average molecular weight of about 10,000–40,000 and the carboxyl groups are neutralized with ammonia or an amine.

6 Claims, No Drawings

WATERBORNE ACRYLOURETHANE PIGMENT DISPERSANT POLYMER

BACKGROUND OF THE INVENTION

This invention is directed to a waterborne polymer for dispersing pigments and and in particular to a waterborne acrylourethane polymer used for dispersing pigments in waterbased coating compositions.

Waterbased coating compositions of acrylic copolymer are shown in Wilfinger et al U.S. Pat. No. 4,730,020 issued Mar. 8, 1988. Waterbased dispersions of polyurethanes are known as shown in Drexler et al U.S. Pat. No. 4,489,135, issued Dec. 18, 1984. Coatings of acrylourethane reaction products are shown in Stamegna et al U.S. Pat. No. 4,711,929 issued Dec. 8, 1987. Graft copolymers of acrylic resins having urethane graft components are shown in Simms U.S. Pat. No. 4,243,573 issued Jan. 6, 1981. However, none of the compositions shown in the art suggest a pigment dispersing resin that is useful particularly in waterbased acrylic coating compositions that will adequately disperse pigments in these compositions and be compatible with the acrylic polymers used in these compositions to form high quality exterior original equipment automotive and truck finishes and exterior repair finishes for automobiles and trucks.

For original equipment manufacture of automobiles and trucks and for the repair of damaged finishes of automobiles and trucks, the industry will be using waterbased coating compositions to reduce air pollution. There is a need for a dispersion resin that will be an excellent pigment dispersant for all types of pigments particularly metallic flake pigments and difficult to disperse pigments such as iron oxide pigments and that will be compatible with the film forming binder of the coating composition and will form a high quality, i.e., glossy, durable and weatherable exterior finish for automobiles and trucks.

SUMMARY OF THE INVENTION

An improved waterbased coating composition containing about 10-50% by weight of film forming binder and pigment in a pigment to binder weight ratio of about 1/100 to 200/100 dispersed in an aqueous carrier and having a pH of about 7-10; wherein the improvement used in the composition is a acrylourethane pigment dispersing polymer in an amount of about 0.5-10% by weight, based on the weight of the coating composition; the acrylourethane pigment dispersing polymer is composed of hydroxyl and carboxyl functional acrylic polyol a hydroxyl no. of about 50-170 and an acid no. of about 30-120 and is chain extended with an aliphatic, cycloaliphatic or aromatic diisocyanate in the presence of a monohydric alcohol and the polymer has a weight average molecular weight of about 10,000-40,000 and the carboxyl groups are neutralized with ammonia or an amine.

An aqueous solution of the acrylourethane and articles coated with the improved coating composition are also part of this invention.

DETAILED DESCRIPTION OF THE INVENTION

The coating composition of the invention is stable for extended periods of time, i.e., pigments and film forming binder remain dispersed, has a very low VOC (volatile organic content) be pigmented with all existing commercial pigments used for automobiles and trucks, forms finishes that are hard, glossy, weatherable and durable. In particular, the composition has excellent adhesion to a variety of substrates such as previously painted substrates, cold rolled steel, phosphatized steel, steel coated with conventional primers such as electrodeposition primers that typically are crosslinked epoxy esters and various epoxy resin, alkyd resin repair primers, plastic substrates such as polyester reinforced fiber glass, reaction injection molded urethanes and partially crystalline polyamides. A clear coat can be applied to a layer of the pigmented coating composition of this invention to provide a clear/color coat finish.

The coating composition can also be formulated into primer compositions and used over cold rolled steel, treated steel such as phosphatized steel or the aforementioned plastic substrates.

The coating composition has a film forming binder content of about 10-50% by weight and correspondingly, about 90-50% by weight of an aqueous carrier which is primarily water but often contains small amounts of organic solvents for the binder. The composition contains pigments in a pigment to binder weight ratio of about 1/100-200/100.

The film forming binder of the composition can be any of a variety of well known binders used in water based coating compositions such as acrylic polymers, polyesters, epoxy polyesters, acrylic polyesters, acrylourethanes, polyesterurethanes, polyetherurethanes and acrylic silane polymers. These polymers typically have functional acid groups which are reacted with an amine or ammonia to provide water dispersiblity or water solubility and the pH of the coating composition usually is adjusted with ammonia or amine to about 7-10.

The coating composition contains about 0.5-10% by weight, based on the weight of the coating composition, of an acrylourethane pigment dispersing polymer. The acrylourethane polymer is a hydroxy and carboxyl functional acrylic polyol having a hydroxyl no. of about 50-170 and an acid no. of about 30-120 that is chain extended with an aliphatic, cycloaliphatic or aromatic diisocyanate in the presence of a monohydric alcohol. The acrylourethane has a weight average molecular weight of about 10,000-40,000, preferably about 15,000-30,000. The acrylic polyol, monohydric alcohol and the diisocyanate are reacted in a ratio such that the hydroxyl to isocyanate ratio is of about 5:1 to 2:1 to provide an acrylourethane having a polymeric structure of about 3-12 acrylic polyol units that are chain extended with diisocyanate. The resulting acrylourethane polymer has reactive carboxyl groups, hydroxyl groups and any residual isocyanate groups are blocked with monohydric alcohol.

All molecular weights herein are measured by gel permeation chromatography using polystyrene as the standard.

One useful and preferred acrylourethane polmer contains about 90-98% by weight of acrylic polyol, 1-9% by weight of aliphatic, cycloaliphatic or aromatic diisocyanate, and 0.5-1% by weight monohydric alcohol.

The acrylic polyol is formed by conventional solution polymerization by mixing monomers, solvent, polymerization catalyst and polymerizing in a conventional polymerization reactor by heating the constituents in the reactor to about 70°-95° C. for about 15 minutes to 8 hours to form the acrylic polyol. A catalyst such as dibutyl tin dilaurate and diisocyanate and a monohydric alcohol are then added and the resulting mixture is heated to about 70°-95° C. for about 90-300 minutes until all of the diisocyanate has reacted to form a polymer. Ammonia or amine is added to the polymer solution and then water is added to form a solution or a very fine dispersion having a particle size of 1-100 nanometers. Additional ammonia or amine can be added to adjust the pH to about 7-10.

Typical catalysts used to form the acrylic polyol are azobisisobutyronitrile, 2,2'-azobis(methylbutyronitrile), 2,2'-azobis(2,4-di methylvaleronitrile), 2,2-azobis(2,4-dimethyl pentane nitrile), 2,2'-azobis(2-methyl butane nitrile), t-butyl peroxypivalate and the like.

Solvents used to form the acrylic polyol are, for example, toluene, xylene, ethyl acetate, acetone, methyl ethyl ketone, methyl isobutyl ketone, and other aliphatic, cycloaliphatic and aromatic hydrocarbon esters and ethers, as are conventionally used.

Monomers that are used to form the acrylic polyol are alkyl methacrylates and acrylates having 1-12 carbons atoms in the alkyl groups such as methyl methacrylate, ethyl acrylate, propyl acrylate, propyl methacrylate, butyl methacrylate, isobutyl methacrylate, butyl acrylate, isobutyl acrylate, hexyl acrylate, hexyl methacrylate, 2-ethylhexyl methacrylate, 2-ethylhexyl acrylate, lauryl methacrylate and the like. Also, up to about 20% by weight of styrene can be used to form the acrylic polyol.

Typical monomers that provide the hydroxyl component to the polyol are hydroxy alkyl acrylates or methacrylates having 1-8 carbon atoms in the alkyl group such as hydroxy ethyl acrylate, hydroxy ethyl methacrylate, hydroxy propyl methacrylate, hydroxy propyl acrylate, hydroxy butyl methacrylate, hydroxy butyl acrylate, hydroxy octyl methacrylate, hydroxy octyl acrylate and the like.

Typically useful ethylenically unsaturated acid are methacrylic acid, acrylic acid and itaconic acid. Preferably, alpha-beta monoethylenically unsaturated monocarboxylic acids are used.

A preferred acrylic polyol that forms a high quality pigment dispersant contains about 50-60% by weight of methyl methacrylate, 25-35% by weight butyl acrylate, 5-10% by weight hydroxy ethyl methacrylate, and 5-15% by weight acrylic acid.

To form the acrylourethane, a catalyst is added to the acrylic polyol and the diisocyanate. Such catalysts are for example, dibutyl tin dilaurate, stannous octoate, zinc octoate, stannous oleate, zinc naphthenate, vanadium acetyl acetonate and zirconium acetyl acetonate.

Diisocyanates that can be used to form the acrylourethane are as follows: tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,12 dodecane diisocyanate, 1,3-cyclopentylene diisocyanate, 1,4-cyclohexylene diisocyanate, bis-(4-isocyanatocyclohexyl)-methane, m-tetramethyl xylene diisocyanate, toluene diisocyanate, 4,4'-biphenylene diisocyante, 1,3-phenylene diisocyanate, 1,5-naphthalene diisocyanate, 4,4'-diisocyanatodiphenyl ether and the like. The preferred diisocyante is m-Tetramethylene xylene diisocyanate since it forms an excellent pigment dispersant.

The diisocyanate is reacted with the acrylic polyol in the presence of a monohydric alcohol which is necessary to prevent gellation of the acrylourethane during preparation. Typically useful monohydric alcohols include methanol, ethanol, propanol, isopropanol, butanol, isobutanol, and the like. If the hydroxyl content of the acrylic polyol is adjusted so that no excess of hydroxyl is present, it may be possible to form the acrylourethane without the presence of the alcohol.

After the acrylourethane polymer is formed, an amine or ammonia are added to neutralize the polymer and then water is added to form an aqueous dispersion and the pH is adjusted to about 7-10 with additional ammonia or amine. Typically useful amines include dimethyl ethanolamine, triethylamine, ethylene diamine, diaminopropane, hexamethylene diamine, aminoethylethanolamine, trimethylamine, triphenylamine and the like.

A mill base or pigment dispersion is formed with the acrylourethane by dispersing pigments in the acrylourethane by conventional techniques such as high speed mixing, sand grinding, ball milling, attritor grinding or two roll milling. The resulting mill base or pigment dispersion then is blended with other constituents used in a coating composition such as the film forming binder and additives such as rheology control additives and thickeners.

Typical pigments that can be used in the mill base are metallic oxides such as titanium dioxide, zinc oxide, iron oxides of various colors, carbon black, filler pigments such as talc, china clay, barytes, carbonates, silicates, and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones and the like.

When coating compositions are prepared from mill bases containing metallic pigments, agents which inhibit the reaction of the pigments with water may be added. Typical inhibitors are phosphated organic materials such as "Vircopet" 40 available from Mobil Chemical Co.

Ultraviolet light stabilizers which includes ultraviolet light absorbers, screeners and quenchers can be incorporated into the mill base generally in amounts of about 0.01-2% by weight, based on the weight of the binder, of the coating composition. Typical ultraviolet light stabilizers include benzophenones, triazines, triazols, benzoates, hindered amines and blends thereof.

Coating composition are formulated with the mill base using any of the aforementioned water based film forming binders.

Thickeners and rheology control agents can be added to the coating composition in amounts of about 0.5-5% by weight of the coating composition to provide the desired spray viscosity. Typically, acrylic polymers such as polyacrylic acid, clays such as "Bentones", cellulosics, or urethanes can be added.

If needed surfactants can be added to the coating composition in amounts of about 0.1-5% by weight, based on the weight of the coating composition. Typically useful surfactants are nonylphenoxypolyethyleneoxy ethanol sulfate, allyl dodecyl sulfosuccinate, alkyl phenoxy polyethylene oxyethanol, sodium lauryl sulfate and mixtures thereof. One preferred surfactant is a mixture of nonylphenoxy polyethyleneoxy ethanol sulfate and allyl dodecyl sulfosuccinate.

The coating composition can be applied to a plastic or metal substrate by conventional techniques such as spraying, electrostatic spraying, dipping, brushing, flowcoating and the like. The preferred method is spraying. After application, the composition is dried at ambient temperatures but can be baked at about 50°–80° C. for about 5–45 minutes to form a coating layer about 0.1–2.0 mils thick. Generally the layer is about 0.5–1.5 mils thick. For clear coat/color coat systems a clear layer usually a solvent based composition is applied to a dry film thickness of about 1.5–2.5 mils. Aqueous based clear coating compositions also can be used.

The following example illustrates the invention. All parts and percentages are on a weight basis unless otherwise indicated. Molecular weights are determined by gel permeation chromatography using polystyrene as the standard.

EXAMPLE 1

An acrylourethane solution was prepared by first forming an acrylic polyol, reacting the polyol with a diisocyanate and neutralizing the acrylourethane with ammonia and adding water to form the dispersion.

Acrylic Polyol

The following constituents were charged into a reactor equipped with a thermometer, stirrer, reflux condenser and a moisture trap:

|  | Parts by Weight |
|---|---|
| Portion 1 | |
| Methyl ethyl ketone | 422 |
| Portion 2 | |
| Methyl methacrylate monomer (MMA) | 700 |
| Butyl acrylate monomer (BA) | 440 |
| Hydroxyethyl methacrylate monomer (HEMA) | 96 |
| Acrylic acid monomer (AA) | 137 |
| Methyl ethyl ketone | 23 |
| Portion 3 | |
| 2,2'-Azobis(2,4-dimethylvaleronitrile) | 124 |
| Methyl ethyl ketone | 128 |
| Ethyl acetate | 128 |
| Total | 2198 |

Portion 1 was added to the reactor. Portion 2 was blended together and added to the reactor at a uniform rate with constant stirring over a 4 hour period. Portion 3 was premixed and added simultaneously with Portion 2 at a uniform rate over a 4 hour and 40 minute period while the reaction mixture was maintained at its reflux temperature. After the addition of Portions 2 and 3 was complete, the temperature of the reaction mixture was maintained at its reflux temperature for an additional 30 minutes. The mixture was cooled to 65° C. while being continuously stirred. 14 parts of cyclohexane were added and the mixture was then heated to its reflux temperature with constant stirring and held at this temperature for 30 minutes. 114 parts of a mixture of methyl ethyl ketone, ethyl acetate, cyclohexane and water were removed by azeotropic distillation.

The resulting acrylic polyol solution has a solids content of 70.0%. The resulting polymer has an inherent viscosity of 0.089, a weight average molecular weight of 17,000, a hydroxy no. of 90, an acid no. of 65 and a viscosity of $Z_1$ to $Z_2$ on the Gardner-Holdt scale.

Acrylourethane

The following constituents were charged into a reactor equipped as above:

|  | Parts by Weight |
|---|---|
| Portion 1 | |
| Acrylic polyol solution (prepared above) | 2098.00 |
| Dibutyl tin dilaurate | 0.36 |
| Butanol | 11.00 |
| Portion 2 | |
| m-tetramethyl xylene diisocyanate | 34.00 |
| Total | 2143.36 |

Portion 1 was charged into the reactor and the mixture was stirred and heated to its reflux temperature of about 100° C. Portion 2 added at a uniform rate over a 30 minute period with constant stirring while maintaining the reaction mixture at its reflux temperature. The resulting mixture is held at its reflux temperature for an additional hour. A sample of the reaction mixture was removed and analyzed on an infrared spectrophotometer for unreacted isocyanate groups. No unreacted isocyanate groups were present indicating that all of the issocyanate had reacted with the hydroxyl groups of the acrylic or had been blocked with butanol. The mixture was then cooled to ambient temperature.

The resulting polymer solution has a solids content of 71.0% and a pH of 8.1. The acrylourethane polymer has an inherent viscosity of 0.160, a weight average molecular weight of 35,700, and a viscosity of $Z_3$ to $Z_4$ on the Gardner Holdt scale.

Waterbased Acrylourethane

To the above prepared acrylourethane solution about 128 parts by weight of a 29% aqueous ammonium hydroxide solution was added over a 10 minute period with constant stirring. Stirring was continued for about 15 minutes and then 1576 parts of deionized water are added over a 30 minute period with constant stirring. The resulting aqueous acrylourethane polymer solution has a pH of 8.1 and a solids content of about 39%.

Metallic Color Basecoating Composition

A basecoating composition was prepared by first forming a millbase and then blending the millbase with the other constituents of the coating composition.

A millbase was prepared as follows:

|  | Parts by Weight |
|---|---|
| Portion 1 | |
| Acrylourethane solution (prepared above) | 22.30 |
| Deionized water | 30.70 |
| Cobalt phthlocyanine blue pigment | 22.00 |
| Portion 2 | |
| Deionized water | 25.00 |
| Total | 100.00 |

Portion 1 was charged into an attritor and the pH was adjusted to 9.0 with an aqueous ammonium hydroxide solution and the constituents were ground for 6 hours. Portion 2 was added and the composition was ground for 16 hours to form a millbase having a pigment/binder weight ratio of 251/100 and a volume solids of 23.43.

A basecoating composition was prepared as follows:

|  | Parts by Weight |
| --- | --- |
| Portion 1 | |
| Ethylene glycol monobutyl ether | 35.00 |
| Inhibitor solution (phosphated organic material) | 3.43 |
| Aluminum flake paste (60% solids of aluminum flake in mineral spirits) | 9.30 |
| Portion 2 | |
| Millbase (prepared above) | 90.70 |
| Deionized water | 78.00 |
| Acrylic latex (40% solids of methyl methacrylate/styrene/2-ethylhexyl acrylate/methylol methacrylamide/ hydroxyethyl acrylate/methacrylic acid in a weight ratio of 36/15/39/3/3/3) | 138.00 |
| Polyether urethane latex ("Neorez" R-970-ICI Resins - 40% solids of aliphatic polyurethane having a particle size of about 0.1 micron) | 41.03 |
| Thickener (acrylic copolymer emulsion polyacrylic acid-Acrysol ASE-60-Rohm and Hass Co.) | 3.95 |
| Ammonium hydroxide solution (29% aqueous solution) | 11.42 |
| Deionized water | 59.32 |
| Total | 470.15 |

Portion 1 was charged into a mixing vessel and mixed for 30 minutes. Portion 2 was primixed for about 30 minutes and charged into the mixing vessel and mixed for an additional 30 minutes with portion 1 to form a basecoating composition.

The basecoating composition was sprayed onto primed cold-rolled steel panels. The panels were then spray-coated with a two component acrylic urethane clear coating composition and cured at ambient temperatures for 21 days. The resulting basecoat had a dry film thickness of about 0.6-0.8 mils and the clear coat had a dry film thickness of about 2.0-3.0 mils.

The coating on the panel had the following properties:
Appearance—excellent
20° Gloss—99
Dry crosshatch and tape adhesion—10
Humidity resistance (96 hour at 38 deg. C./100% rel. humidity):
    Crosshatch adhesion—10
    Blistering—10
Rating system 0-10, 10—best, 0—worst Solid Color Basecoating Composition A millbase was prepared as follows:

|  | Parts by Weight |
| --- | --- |
| Portion 1 | |
| Acrylourethane solution (prepared above) | 4.20 |
| Deionized water | 27.30 |
| Opaque iron oxide pigment | 33.60 |
| Portion 2 | |
| Acrylic latex (described above) | 18.90 |
| Total | 84.00 |

Portion 1 was charged into an attritor and the pH was adjusted to 9.0 with an aqueous ammonium hydroxide solution and the constituents were ground for 5.5 hours. Portion 2 was added and the composition was mixed for 30 minutes to form a millbase.

A basecoating composition was prepared by adding the following constituents to the above prepared mill base and thoroughly mixing the constituents for about 30 minutes:

|  | Parts by Weight |
| --- | --- |
| Deionized water | 92.00 |
| Acrylic latex (described above) | 107.90 |
| Polyurethane dispersion (described above) | 51.80 |
| Inhibitor solution (phosphated coester of alcohol and aliphatic ethoxylate) | 0.34 |
| Thickener solution (deionized water 71.81%, ethylene glycol monobutyl ether 10.90%, aqueous ammonium hydroxide 4.8%, Acrysol TT-615 Rohm and Hass - acrylic acid copolymer thickener 12.94%) | 19.75 |
| Total | 271.79 |

The basecoating composition was sprayed onto primed cold-rolled steel panels. The panels were then spray-coated with a two component acrylic urethane clear coating composition and cured at ambient temperatures for 21 days. The resulting basecoat had a dry film thickness of about 1.3 mils and the clear coat had a dry film thickness of about 1.9 mils.

The coating on the panel had the following properties:
Appearance—excellent
20° Gloss—94
Dry crosshatch and tape adhesion—10
Humidity resistance (96 hour at 38 deg. C./100% rel. humidity):
    Crosshatch adhesion—9.5
    Blistering—10
Rating system 0-10, 10—best, 0—worst

What is claimed is:

1. An aqueous dispersion comprising an aqueous carrier and about 10-70% by weight of an acrylourethane pigment dispersing polymer; wherein the acrylourethane polymer consists essentially of about 90-98% by weight, based on the weight of the acrylourethane polymer, of a hydroxyl and carboxyl functional acrylic polyol having a hydroxyl no. of about 50-170 and an acid no. of about 30-120 chain extended with about 1-9% by weight, based on the weight of the acrylourethane polymer, of an aliphatic, cycloaliphatic or aromatic diisocyanate in the presence of about 0.5-1% by weight, based on the weight of the acrylourethane polymer, of monohydric alcohol; wherein the acrylourethane polymer has a weight average molecular weight of about 10,000-40,000 and the carboxyl groups are neutralized with ammonia or an amine and wherein the acrylic polyol consists essentially of polymerized monomers of alkyl methacrylate, alkyl acrylate wherein the alkyl groups have 1-12 carbon atoms, hydroxy alkyl acrylate or methacrylate wherein the alkyl groups have 1-8 carbon atoms and an alpha-beta ethylenically unsaturated monocarboxylic acid.

2. The aqueous dispersion of claim 1 in which the aqueous carrier comprises about 10-30% by weight of solvent for the acrylourethane and 70-90% by weight water.

3. The aqueous dispersion of claim 2 in which the acrylic polyol consists essentially of polymerized monomers of about 50-60% by weight, based on the weight of the acrylic polyol, of methyl methacrylate, 25-35% by weight, based on the weight of the acrylic polyol, of butyl acrylate, 5–10% by weight, based on the weight of the acrylic polyol, of hydroxy ethyl methacrylate and 5–15% by weight of the acrylic polyol, of acrylic acid.

4. The aqueous dispersion of claim 2 in which the diisocyanate of the acrylourethane is isophorone diisocyanate and the monohydric alcohol is butanol.

5. The aqueous dispersion of claim 2 in which the diisocyanate is m-tetramethyl xylene diisocyanate and the monohydric alcohol is butanol.

6. The aqueous dispersion of claim 1 in which the acrylourethane contains up to 20% by weight styrene.

* * * * *